United States Patent [19]

Ballu

[11] Patent Number: 4,716,678
[45] Date of Patent: Jan. 5, 1988

[54] ARRANGEMENT FOR TREATMENT OF CULTURE BY MOISTENING

[75] Inventor: Patrick Ballu, Reims, France

[73] Assignee: Tecnoma S.A., Epernay, France

[21] Appl. No.: 888,347

[22] Filed: Jul. 10, 1986

Related U.S. Application Data

[63] Continuation-in-part of Ser. No. 603,433, Apr. 24, 1984, abandoned.

[30] Foreign Application Priority Data

May 4, 1983 [FR] France .................... 83 400898

[51] Int. Cl.$^4$ .................................. A01G 15/00
[52] U.S. Cl. ......................................... 47/1.5

[56] References Cited

U.S. PATENT DOCUMENTS

| | | | |
|---|---|---|---|
| 1,764,952 | 6/1930 | Hay | 47/1.5 |
| 2,930,334 | 3/1960 | Marron et al. | 111/6 |
| 3,021,642 | 2/1962 | Ewing | 47/1.5 |
| 3,077,701 | 2/1963 | Osmun | 47/1.5 |
| 3,267,610 | 8/1966 | Hills | 47/1.7 |
| 4,253,272 | 3/1981 | Bertness | 47/1.5 |
| 4,302,904 | 12/1981 | Mead | 47/1.5 |
| 4,459,777 | 7/1984 | Moore et al. | 47/1.5 |
| 4,471,570 | 9/1984 | Chandler | 47/1.5 |

Primary Examiner—Robert A. Hafer
Assistant Examiner—Danton D. DeMille
Attorney, Agent, or Firm—Darby & Darby

[57] ABSTRACT

This invention relates to a device for treatment of culture by moistening. This device comprises at least one practically horizontal tubular tank (3) having a slit (4) in which are clamped the upper ends (2) of flexible capillary wicks (1) adapted for resting on the vegetation. This tank (3) is intermittently fed with a pressurized liquid, such as a weed-killer. According to the invention, each inlet (5) through which pressurized liquid is intermittently fed to a tank (3) is provided with a calibrated orifice (6) acting as an atomizer for spraying liquid into the tank. Preferably, a ball valve (7) biased by a spring (9) against its seat (8) is provided for preventing the liquid from dripping into the tank (3) during interruptions of pressure. In case the upper ends (2) of the wicks (1) are so tightly clamped in the slit (4) of the tank that capillary flow would be impeded, a row of orifices (10) is provided along an edge of the slit (4) for allowing liquid to seep onto the wicks (1).

3 Claims, 4 Drawing Figures

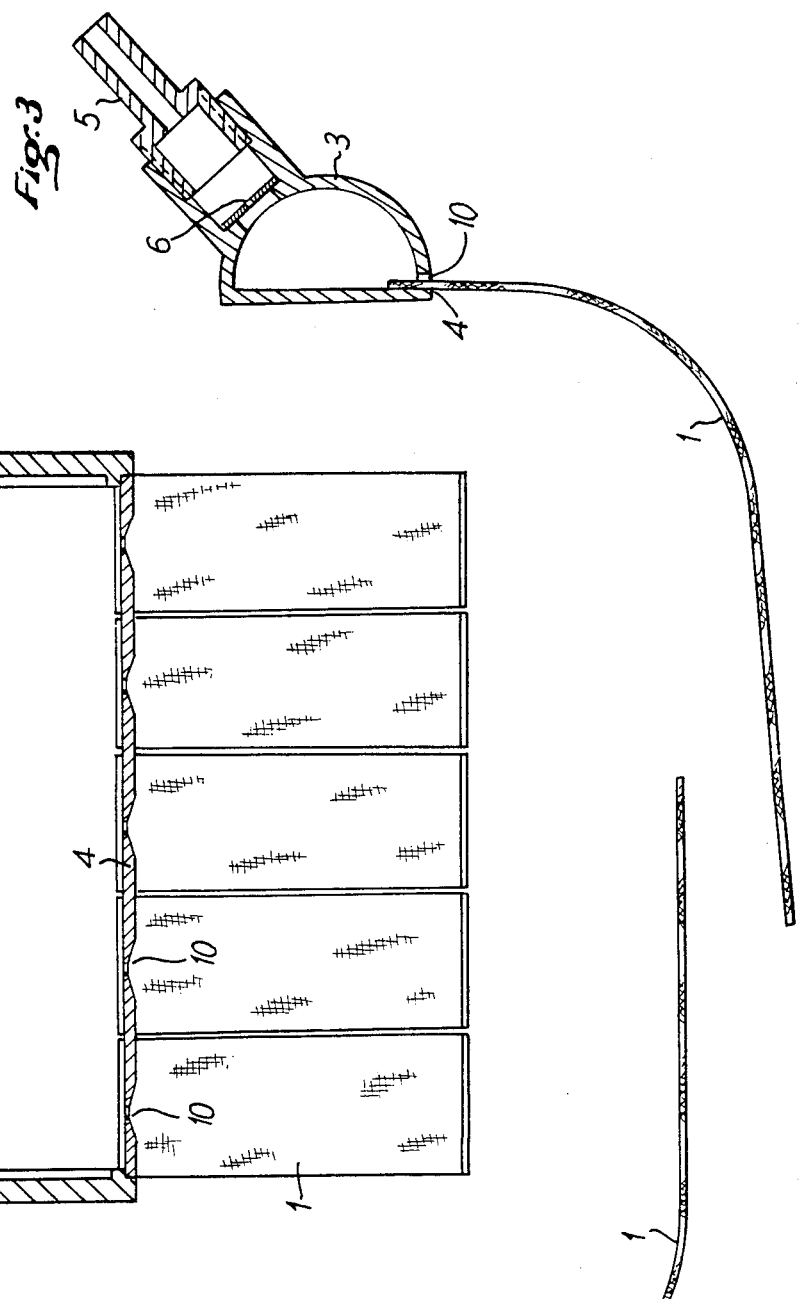
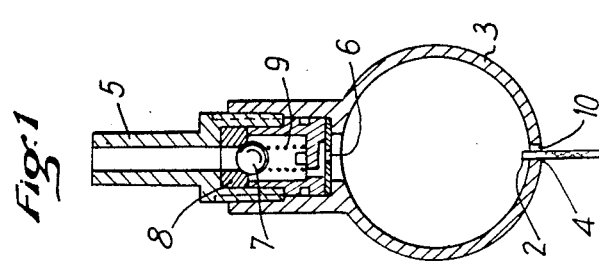

ARRANGEMENT FOR TREATMENT OF CULTURE BY MOISTENING

This is a continuation-in-part of co-pending U.S. patent application Ser. No. 603,433, filed on Apr. 24, 1984, now abandoned.

This invention relates to improvements in devices of the kind described in Applicant's European Pat. No. 82. 4 019 475 filed on Oct. 22, 1982 for a device for treatment of culture by moistening. The invention also relates to a novel arrangement applicable to such devices.

In the aforesaid European Patent is described an apparatus comprising at least one horizontal tubular tank within which are clamped the upper ends of flexible lashes having capillary properties and adapted for resting on the vegetation, these lashes being flat and made of braid or of an equivalent material, their upper ends being adjacent to each other and being clamped side-by-side in a longitudinal slit of the tank, the tank being discontinuously fed with a liquid for the treatment of culture by moistening. This apparatus has been designed more particularly for treating crops with a weed-killer liquid.

BACKGROUND OF THE INVENTION

It has now been found that, with an apparatus of the above-mentioned type, the liquid being fed in small amounts to the tubular tank or tanks carrying the flexible braids, is not evenly distributed across the several braids. More specifically, the portions of the braids or wicks which are facing the liquid inlets receive much more liquid than the portions lying further from these inlets, particularly those portions close to the ends of a tubular tank. As a consequence, the result expected from these prior devices is not sufficiently achieved.

On another hand, the solution which consists in providing external spray nozzles, such as described in the aforesaid European Patent and illustrated in FIG. 4 thereof, while improving the even distribution of the weed-killer liquid, offers this serious drawback that it tends to produce a mist which is liable to spread beyond the path of the braids so that it may affect the plants which are to be protected.

It is an object of this invention to provide improvements in devices of the above-mentioned type, for overcoming the above-stated drawbacks.

SUMMARY OF THE INVENTION

According to this invention, each inlet through which pressurized liquid is fed to a tubular tank of the above-described kind is provided with a calibrated orifice acting as a spray nozzle and located in close proximity to the downstream end of said inlet. As a result, the liquid is injected into the tubular tank in the form of a mist, rather than in drops or as a jet. Tests have shown that this improvement achieves a really uniform distribution of liquid to the braids, even though the overall flow-rate of liquid is small. Liquid particles are distributed throughout the inner volume of the tank and reach the braids either directly or through condensation on the inner walls of the tank, from which they flow evenly towards the lower part of the tank. This is achieved without allowing any liquid to be released from the tank in the form of a mist, so that the risk of dropping liquid beyond the path of the braids is eliminated.

More specifically, this invention applies to any device for the treatment of cultivated plants by moistening, comprising at least one practically horizontal tubular tank within which are clamped the upper ends of at least one capillary wick provided for resting their lower ends on the vegetation, this tank being discontinuously fed with pressurized treating liquid.

According to this invention, such a device is characterized by each inlet through which pressurized liquid is fed to a tubular tank being provided with a calibrated orifice having a spraying effect, said orifice being located in close proximity to the downstream end of said inlet in said tank.

According to another feature of the invention, evenly distributed orifices are provided in the lower part of the tank wall alongside the wicks and in communication with said wicks, for ensuring a regular flow of liquid through the wall towards the wicks. This feature is advantageous when the wicks are so tightly clamped in the tank slit that it would impair the capillary flow of liquid through the wicks. This may be the case when the manufacturing operations for producing the device comprise pressure-injection of plastic material over the wicks, resulting in a tight clamping effect.

The presence of evenly distributed orifices alongside the tank slit in which the upper ends of the wicks are tightly clamped is effective for ensuring a proper flow of liquid out of the tank onto the wicks. It also ensures a better pressure drop downstream of the calibrated orifices. This improves the spraying effect inside the tank.

According to a further feature of this invention, a ball valve is provided upstream of each calibrated orifice for preventing the dripping of liquid during any interruption of pressure. This ball valve will stop liquid flow to the calibrated orifices as soon as the pressure drops below a set value, so that the liquid feed into the tanks will always be in the form of a mist, although the feed may be discontinuous.

The device of the present invention permits the wick (or wicks) to receive at most as much liquid (chemical) as it (they) are capable of delivering to the use point (plant) by virtue of the wick's capillarity characteristics. Capillarity cannot be controlled. What can be controlled is the rate at which the wick is exposed to the liquid that is to be transported by capillary action. If the wick is simply dipped in a reservoir of liquid no control of the capillary flow can be achieved. Thus, it is important that the wick(s) of this device not be allowed to be exposed to accumulated liquid in the chamber (tank) of the present device. Hence, the wicks receive only condensed mist either directly from the interior of the chamber or through condensation of the chemical on the walls of the chamber which then flows down the wall by creeping flow and flows to the end of a wick. The wicks are not saturated with liquid.

Metered quantities of liquid chemical are therefore delivered in mist form to the chamber where such chemical has access to the wicks as described above. The mist form also helps even distribution of the chemical along the length of the wick.

Therefore, the flow of the chemical into the chamber must be controlled and adjustable. It is preferred that such flow be intermittent.

Moreover, clamping the wick onto the chamber may alter the capillarity characteristics of the wick. Therefore, appropriate openings are provided in communication with the wick end so that (a) the chamber does not become pressurized after forcing pressurized mist in it and (b) the wick's capillarity characteristics are not altered by clamping.

The invention will now be described in detail, with reference to the appended drawings, in which:

FIG. 1 shows a transverse cross-section of a tubular tank for an improved treatment apparatus according to the invention, FIG. 2 shows a longitudinal cross-section of the same tank, FIG. 3 shows, in longitudinal cross-section, a modified embodiment of the tank.

FIG. 4 shows a portable embodiment of a device according to the present invention.

DETAILED DESCRIPTION OF THE INVENTION

The overall assembly of the treatment apparatus may be manufactured in accordance with the description and drawings of above-mentioned European Pat. No. 82. 4 019 475 filed on Oct. 22, 1982 by the Applicant, so that there is no need to represent it here.

Referring to the appended drawings, it can be seen that the tubular tank 3 carrying the wicks 1 and being intermittently fed with a pressurized liquid through inlet 5, as described in the above-mentioned European Patent, comprises a small disc 6 having a calibrated orifice which acts as a spray nozzle. This disc is placed on the inlet 5, practically adjacent to the tank wall. Portable device 12 comprises a handheld rod 11 having a control trigger 13 adapted for single shot spraying. The tank, 3, is mounted at the end of the rod 11 distal to the operator. The rod is connected via inlet 5 to tank 3 from which wick 1 extends in the same manner as that depicted for example in FIG. 1.

As a result, the weed-killer liquid is sprayed into tank 3 in the form of a mist. This mist remains contained within the tank, so that it cannot directly reach the vegetation, particularly beyond the path of the wicks 1. It spreads uniformly inside the tank 3 and settles (condenses) uniformly on the internal ends 2 of the wicks, and also on the inner walls of the tank, from which it will ooze (by creeping flow) through gravity onto the said internal ends 2 and will impregnate them uniformly so as to become transferred through capillarity to the external part of the wicks with an uniform distribution in spite of the flow rate being very small.

According to a preferred embodiment of the invention, there are additionally provided orifices 10 alongside the slit 4 holding the wicks, and these orifices are evenly distributed over the length of the tube 3, thus ensuring a better liquid flow although the wicks are clamped between the edges of slit 4, particularly when the assembly is manufactured by pressure-injection of plastic material over the wicks so that these are tightly packed within slit 4.

In the example represented here, one orifice 10 has been provided for each wick 1, but a larger number of such orifices may be provided, particularly when wide wicks, or even one single web 1 is being used.

Orifices 10 are preferably formed on one or both edges of slit 4 and communicate with this slit.

This arrangement offers the further advantage of maintaining a practically nil constant pressure within tank 3. The pressure drop between inlet 5 and the inner volume of the tank 3 ensures a proper operation of the calibrated orifice 6 as an atomizer. However, the mist being sprayed remains contained within tube 3 and it can moisten nothing except the wicks 1.

Immediately upstream of the calibrated orifice 6 may be provided a ball valve 7 biased by a calibration spring 9 urging the ball 7 to rest against a seat 8 or equivalent means.

As soon as the pressure drops below a set value, either when stopping the operation of the apparatus, or during interruptions of the intermittent pressurized feed, the ball 7 is urged against its seat 8 and the liquid being fed through inlet 5 is prevented from dripping into tube 3. This tube is thus exclusively supplied with a mist which will ensure a uniform moistening of the upper end 2 of the wicks, which protrudes slightly within the tube or lies flush with the tube wall. However, this valve arrangement is not strictly necessary when orifice(s) 6 is or are sufficiently small for holding back the liquid in the absence of pressure.

While FIG. 1 shows the tubular tank 3 with a circular cross-section, this may take any other suitable shape, particularly the semi-circular section shown in FIG. 3, in which the upper ends 2 of the wick(s) 1 are inserted against the planar face of the tank. It is however essential that the slit 4 as well as the openings 10 should be located in the lower part of the internal volume of tank 3 for ensuring gravity flow of the liquid. It is also essential that the orifices 10 should be in contact with the wick(s) 1.

In the example of FIG. 2, the wicks 1 form one single moistener web as they lay side-by-side. However, and more specially when the tank 3 is relatively short in length, a single wick may be provided for each tank, this wick extending approximately along the full length of the tank and forming a wide web. It is also possible to use wicks having different cross-sections, and being non-contiguous.

A treatment device according to the invention comprises one or several tubular tanks 3 mounted in a known manner, for instance as a hand-held device or a tractor-drawn unit, such as particularly described in the aforesaid European Patent. The intermittent liquid feed to inlet(s) 5 may be obtained by any mechanical, electromechanical or electronic means.

According to a modified embodiment of this invention, the device consists in at least one tank 3 mounted on the end of the hand-held rod of a portable sprayer device of a type in which pressure is maintained or built-up in advance in a pressure tank, this device being provided with a flow control trigger.

Such devices are in widespread public use and do not require a specific description (cf particularly French Pat. Nos. 1 494 165 and 2 285 069, as well as the device marketed under the designation Tecnoma T 16P).

Intermittent actuation of the trigger by the operator results in the tank 3 being discontinuously fed with pressurized liquid, so that this tank will then be enabled to function in the manner described hereinabove.

When the device of the invention is provided with the arrangement comprising orifices 10 alongside the slit 4, it is not necessarily required that the upper end 2 of a wick 1 should protrude substantially into the tank 3, and there is no objection against this end of a wick being confined within the tank wall, since the orifices 10 being in contact with the wicks will supply them with herbicidal liquid.

What is claimed is:

1. A device for applying controlled quantities of chemicals to selected plants while substantially avoiding accidental delivery of the chemicals to an environment of said plants, said device comprising a chamber for receiving the controlled quantities of liquid chemicals defined by at least inside surface of the walls;

wick means extending from the lower portion of the chamber and having a length with first and second ends, said wick means delivering said chemicals to the plants by a capillary flow through a body of said wick means from the first end to the second end, the second end of the wick means being distal to said chamber and extending out of said chamber for rest contact with said plants;

the first end of said wick means being positioned within the interior of the chamber;

means for delivering said liquid chemicals into the chamber in a pressurized condition in a mist form to be spread out evenly within an interior of the chamber, whereby the chemicals being partially condensed on the inside surface of the walls and on the first end of said wick means positioned within the chamber to ensure the controlled flow of the chemicals equal throughout the entire width of said wick means to the selected plants;

at least one aperture is provided within the wall of the lower portion of the chamber for providing decompression of the tank end ensuring regularity of the capillary flow;

means for pressurizing said chemicals prior to delivery thereof into said chamber;

intermittent means for receiving said pressurized chemicals and for providing a controlled and discontinuous flow of said chemicals into said chamber, the mass inflow rate of said chemicals into said chamber being substantially equal to the rate at which said wick means can deliver said chemicals to the plants by capillary action so that accumulation of said chemicals in said chamber is essentially avoided; and said delivery means defined by atomizing means for receiving said discontinuous liquid flow of chemicals comprising an opening adapted for delivering said chemicals into said chamber in the mist form.

2. The device of claim 1 further comprising a ball valve provided within a liquid inlet communicating with the opening of the atomizing means said valve being adapted to close when the pressure of the liquid chemicals is below a preset value.

3. The device of claim 1 wherein said device is a portable device comprising a handheld rod wherein said chamber is mounted on the distal tip of said handheld rod, said rod being provided with a control trigger adapted for single-shot spraying.

* * * * *